United States Patent
Appleyard et al.

(10) Patent No.: US 8,468,217 B2
(45) Date of Patent: Jun. 18, 2013

(54) MAINTAINING PORTLET DATA CURRENCY WHILE MINIMIZING LATENCY

(75) Inventors: James P. Appleyard, North Richland Hills, TX (US); Romelia H. Flores, Keller, TX (US); Jason A. Salcido, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 11/460,164

(22) Filed: Jul. 26, 2006

(65) Prior Publication Data

US 2008/0040450 A1 Feb. 14, 2008

(51) Int. Cl.
*H06F 15/16* (2006.01)

(52) U.S. Cl.
USPC .......... 709/219; 709/203; 709/213; 709/217; 709/236; 707/707; 707/708; 707/709; 715/772; 715/742; 715/804

(58) Field of Classification Search
USPC .. 709/217, 218, 219, 220, 221, 222; 705/100, 705/106, 14; 715/764, 223
See application file for complete search history.

(56) References Cited

U.S. PATENT DOCUMENTS

| | | | | |
|---|---|---|---|---|
| 5,845,084 A * | 12/1998 | Cordell et al. | | 709/234 |
| 6,163,794 A * | 12/2000 | Lange et al. | | 709/202 |
| 6,427,172 B1 * | 7/2002 | Thacker et al. | | 709/235 |
| 6,668,353 B1 | 12/2003 | Yurkovic | | |
| 6,801,949 B1 * | 10/2004 | Bruck et al. | | 709/232 |
| 7,392,255 B1 * | 6/2008 | Sholtis et al. | | 1/1 |
| 2001/0009016 A1 * | 7/2001 | Hofmann et al. | | 709/219 |
| 2002/0024932 A1 * | 2/2002 | Iizuka | | 370/232 |
| 2002/0052954 A1 | 5/2002 | Polizzi et al. | | |
| 2002/0169852 A1 | 11/2002 | Schaeck | | |
| 2004/0015563 A1 * | 1/2004 | Cotte | | 709/218 |
| 2004/0095392 A1 * | 5/2004 | Sato | | 345/772 |
| 2004/0098497 A1 * | 5/2004 | Banet et al. | | 709/230 |
| 2004/0243928 A1 * | 12/2004 | Hesmer et al. | | 715/505 |
| 2005/0010634 A1 * | 1/2005 | Henderson et al. | | 709/201 |
| 2005/0165639 A1 * | 7/2005 | Ross et al. | | 705/14 |
| 2005/0262219 A1 * | 11/2005 | Allamaraju et al. | | 709/217 |

(Continued)

OTHER PUBLICATIONS

"Developing a Basic Portlet"—IBM Corporation, Feb. 2005 1.publib.boulder.ibm.com/.../com.../IRADv6_Portal_App_Lab.pdf.*

(Continued)

*Primary Examiner* — Krista Zele
*Assistant Examiner* — Randy Scott
(74) *Attorney, Agent, or Firm* — Patents On Demand P.A.; Brian K. Buchheit; Scott M. Garrett

(57) ABSTRACT

Providing data to portlets can include a step of registering a plurality of portlets to determine a type of data required by the portlets. The registering can establish a portlet context for handling future data requests for the portlets. A type of information associated with one of the portlets can be determined. A data acquisition process can be initialized to obtain the determined type of information from a data source. A data request can be received for data of the determined type from the associated portlet. Data can be acquired from the data source using the initialized process. The data request can be responded to using the acquired data. In one embodiment, the acquisition of data from the source and the updating of the portlets can occur asynchronously, where a cache is used to temporarily store data acquired from the data source that is used to update the portlets.

20 Claims, 8 Drawing Sheets

U.S. PATENT DOCUMENTS

| | | | |
|---|---|---|---|
| 2006/0031377 A1* | 2/2006 | Ng et al. | 709/208 |
| 2006/0053376 A1 | 3/2006 | Ng et al. | |
| 2006/0064422 A1* | 3/2006 | Arthurs et al. | 707/10 |
| 2007/0005733 A1* | 1/2007 | Allamaraju | 709/219 |
| 2007/0016429 A1* | 1/2007 | Bournas et al. | 705/1 |
| 2007/0283020 A1* | 12/2007 | Chowdary et al. | 709/227 |

OTHER PUBLICATIONS

"Portlet Development Best Practices"—Project Performance Corporation 2005 1.www.ppc.com/assets/pdf/white-papers/Portlet-Best-Practices.pdf.*

* cited by examiner

MAINTAINING PORTLET DATA CURRENCY WHILE MINIMIZING LATENCY

BACKGROUND

1. Field of the Invention

The present invention relates to the field of Web portals and portlet handling, and, more particularly, to maintaining portlet data currency while minimizing latency.

2. Description of the Related Art

A Web portal is a Web site or service that offers a broad array of resources and information, such as e-mail, search engines, advertising, user-specific reports, personalized contact and task management functions, customized news feeds, local weather, and the like. A Web portal can include multiple Web portlets. Each Web portlet can be a reusable Web component that displays information to portal users from a designated source, which can be different from the source that provides information for the portal. An arrangement of portlets within a portal, a presentation of information within the portal, the responsiveness of this presentation, and other user perceived factors all contribute to the user experience of the portal.

The typical approach for a portlet to retrieve the information that is displayed to a user is for each portlet to independently request information from a data source and to independently present the obtained information to users. FIG. 1 shows the basic interactions executed to enable a client device to utilize one or more data sources linked to one or more portlets to produce a user experience for the portal.

While FIG. 1 assumes the data source used by the portlets is part of a Service Oriented Architecture (SOA) 112, the portlet communication pattern shown in FIG. 1 applies to portlets-data source communications in general and is not limited to a particular software architecture, such as SOA 112.

As shown, the client 102 portlets 106 and 108 of FIG. 1 can utilize JAVASCRIPTS to request that the portlets 106-108 be refreshed. Conventional client-side JAVASCRIPTS use a single thread model. The portal server 104 can create a process to handle retrieving data to update the portal 104. The portlets 106-108 can retrieve data from various components of the SOA 112. Each portlet 106-108 independently follows an equivalent update process. For example, a client 102 can request that information in a selected portal 104 to be refreshed. The portal 104 will render graphical objects in portlet 106 or 108. This rendering can require data values be obtained from a portlet process, which can require information be obtained from the SOA 112. The SOA 112 sends responses back to the common portlet process, to the requesting portlet 106 or 108, which sends data to the portal 104, which properly renders/presents the updated information upon client 102.

Using conventional techniques illustrated in FIG. 1, when multiple portlets require updates, multiple JAVASCRIPT requests are made for each portlet. The portal utilizes the same process on behalf of each portlet to request the information update. This approach consumes significant computing resources, such as processing power and bandwidth. The conventional approach is particularly problematic when real-time information is being presented within one or more portlets. Then, the constant polling for updates and receiving of responses that occur on a portlet-by-portlet basis can quickly overload a system or communication infrastructure to an extent that data updates are delayed, thus detracting from the resultant user experience of the portal.

SUMMARY OF THE INVENTION

The present invention discloses a portal server for refreshing real-time information of portlets obtained from remotely located data sources. The portal server can minimize latency in retrieving real-time data by minimizing unnecessary traffic between the client and the data source. The portal server can locally cache content obtained from data sources and can directly provide cached content to clients responsive to portlet refresh requests. In one embodiment, the portal server can aggregate multiple portlet requests into coarser grained data sets, where updates between the portal server and data sources occur at the data set level. In another embodiment, multiple portal servers can be clustered together to provide resilient operation in the event that a clustered portal server fails. In still another embodiment, the portal server can utilize various handlers, including a registration handler, a management handler, and a data handler to ensure portlet data is kept current.

The present invention can be implemented in accordance with numerous aspects consistent with material presented herein. For example, one aspect of the present invention can include a method of providing data to portlets. The method can include a step of registering portlets to determine a type of data required by the portlets. The registering can establish a portlet context for handling future data requests for the portlets. A type of information associated with one of the portlets can be determined. A data acquisition process can be initialized to obtain the determined type of information from a data source. A data request can be received for data of the determined type from the associated portlet. Data can be acquired from the data source using the initialized process. The data request can be responded to using the acquired data. In one embodiment, the acquisition of data from the source and the updating of the portlets can occur asynchronously, where a cache is used to temporarily store data acquired from the data source that is used to update the portlets.

Another aspect of the present invention can include a second method for providing data to portlets. The method can receive data update requests originating from different portlets. Each of the data update requests can be reoccurring requests to keep portlet displayed information current with a data source. A data acquisition process can be established with the data source for responding to the update requests. A data service can be automatically created that provides data needed to respond to received requests. The data service can receive a data set from the data source. The different data update requests can be responded to using information contained in the received data set. The data service of the method can be a Web service and the data source can be a service provider of a Service Oriented Architecture.

Still another method of the present invention can include a portal server including a registration handler, a master handler, and a data handler. The registration handler can register Web pages or portals that include multiple portlets. The registration handler can determine types of data required by the portlets and a frequency with which data updates of the determined types are needed. The master handler can receive update requests of the determined types from the portlets and can respond to the update requests. The data handler can repetitively obtain data of the determined types from data sources. The master handler can spawn data acquisition processes executed by the data handler.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
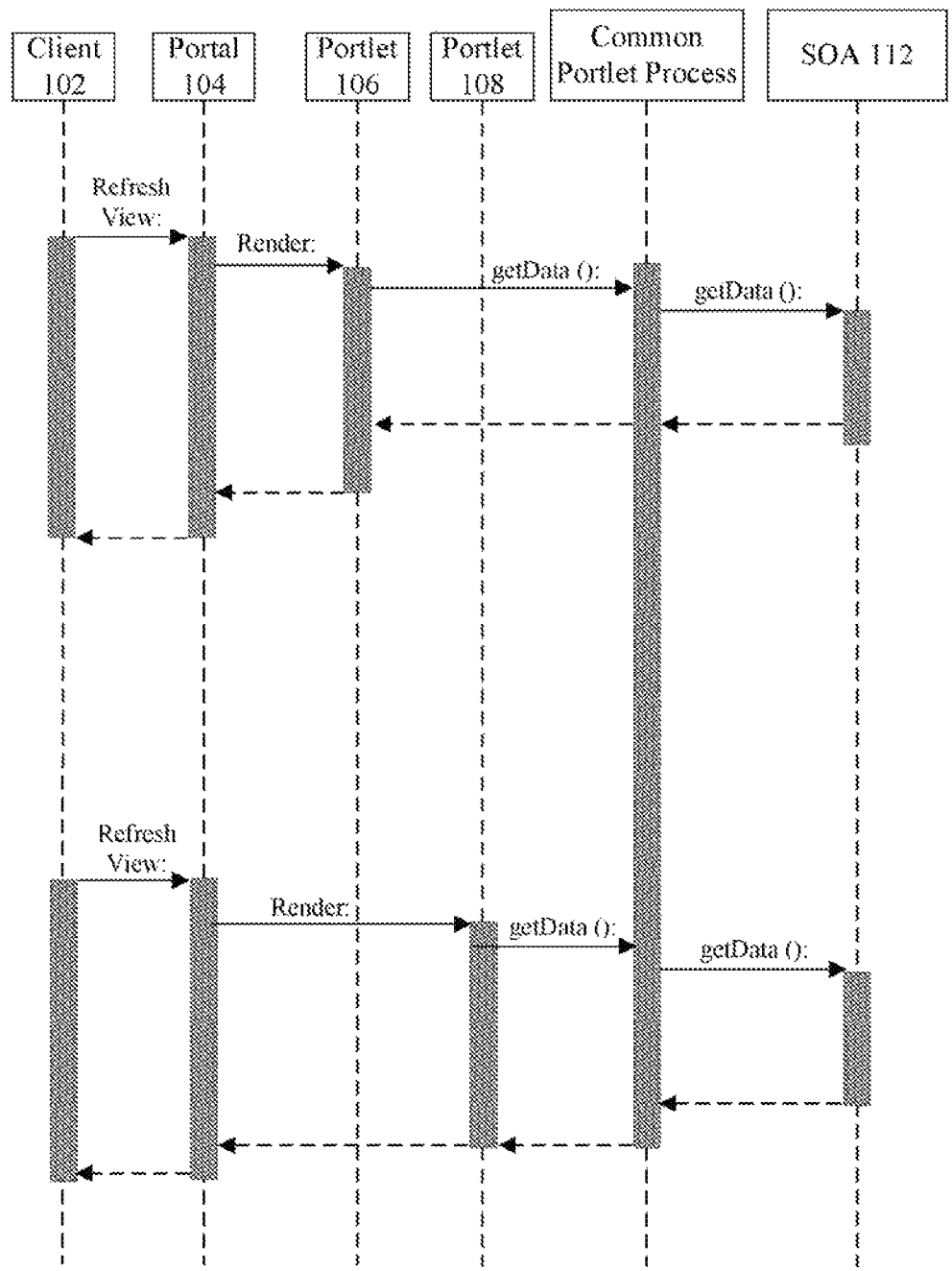
FIG. 1 shows the basic interactions executed to enable a client device to utilize one or more data sources linked to one or more portlets to produce a user experience for the portal.
Figure 2:
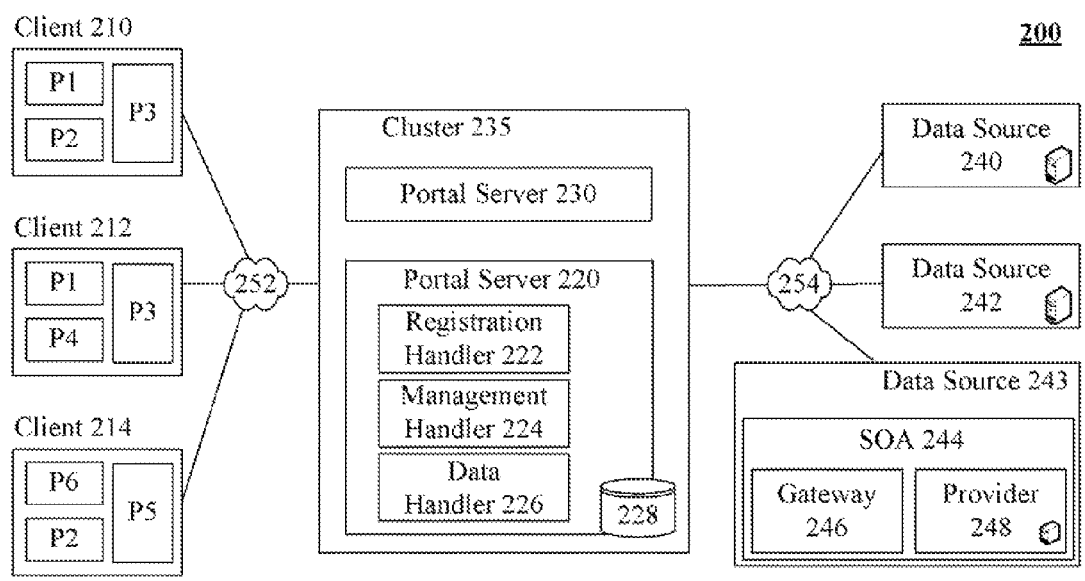
FIG. 2 is a schematic diagram of a system including a portal server for updating portlet information obtained from data sources in accordance with an embodiment of the inventive arrangements disclosed herein.

FIG. 2 is a schematic diagram of a system 200 including a portal server 220 for updating portlet information obtained from data sources in accordance with an embodiment of the inventive arrangements disclosed herein. The portal server 220 can handle information updates for clients 210, 212, and 214, each presenting information within one or more portlets P1-P6. The portlet P1-P6 information can be obtained from one or more data source 240, 242, and 243. Networks 252 and 254 can communicatively link clients 210-214 and data sources 240-243 to portal server 220.

Each client 210-214 can be a computing device capable of presenting Web content. Clients 210-214 can include, but are not limited to, desktop computers, servers, mobile telephones, tablet computers, personal data assistants (PDAs), digital media players, and the like. A portal can be a Web site or gateway that serves as a starting point to other destinations on the Web. A portal provides a mechanism to aggregate information for users to provide a user experience, which can be customized for user preferences. The portal can contain content obtained form multiple data sources 240-243.

A portal can include one or more portlets P1-P6. Each portlet P1-P6 can be a pluggable user interface component. Different portlets P1-P6 can present content derived from different data sources 240-243. For example, portlets P1 and P2 can present data originating at data source 240. Portlets P3 and P4 can present data originating at data source 242. Portlets P5 and P6 can present data originating at data source 243.

Each data source 240-243 can be a computing device including software that delivers or serves content to one or more portlets P1-P6. Data sources 240-243 can be associated with an Internet Protocol (IP) address and/or domain name, which is referenced by an associated portlet P1-P6. Data sources 240-243 can serve Web pages and/or can be providers of one or more Web services.

Data source 243 can be configured in accordance with a Service Oriented Architecture (SOA) 244. The SOA 244 can provide a consistent, reusable method for integrating any type of information consumer with any business process or data provider 248. In SOA 244, services can be self-contained, reusable software modules with well-defined interfaces and can be independent of applications and the computing platforms on which the services run. Data provider 248 can be a data provider that updates data for one or more of the portlets P1-P6. Data can pass between service provider 248 and network 254 through service gateway 246.

The portal server 220 can provide data and can function as a communication intermediary between the clients 210-214 and data sources 240-243. One function of the portal server 220 is to provide real-time information to appropriate ones of the portlets, which can require constant updating. To facilitate this updating, the portal server 220 can cache information from the data sources 240-243 in data store 228. The cached data can be used to directly respond to data update requests. The portal server 220 can update information in the data store 228 on an iterative basis to ensure data currency.

For example, a data update for portal P1 can be required by client 210 and 212, which would normally be obtained from data source 240 directly. Instead, portal server 220 can periodically and/or intermittently obtain updates for portlet P1 from the data source 240 and place update results in data store 228. Whenever client 210 or 212 requires updates to P1, these updates can be directly obtained from data store 228. This arrangement can push data updates closer to the clients 210-214 and can minimize data update requests handled by data source 240 and network 254. Consequently, the clients 210-214 can experience a quicker response time, while load upon network 254 and data source 240 is reduced. The solution is highly scalable and also brings real-time information closer to the end-user, therefore reducing latency of data retrievals.

In another example, the portal server 220 can consolidate common types of real-time information. For example, portal P3 and P4 can both obtain update information from data source 242. These data updates can be for related information. Portal server 220 can aggregate the information required by portlets P3 and P4 into a single data set, which may have a coarser granularity level than non-aggregated data sets associated with P3 and P4. Portal server 220 can then intermittently retrieve data updates for the aggregated data set, which are placed in data store 228. Data requests from portlets P3 and P4 can be directly answered using the aggregated data set information stored in data store 228.

In still another example, the portal server 220 can retrieve data for portlets P5 and P6 from service provider 248. A first time that a data update is received from client 210-214 for portlets P5 and/or P6, the portal server 220 can establish a new data acquisition service designed to retrieve the necessary information from provider 248. The service can iteratively update the information, placing the updated information in data store 228. Thus, portal server 220 can respond to update requests related to portlets P5 and P6 directly using updated information stored in the data store 228. So long as one or more clients 210-214 require data updates related to portlets P5 and/or P6, an associated service will be maintained between portal server 220 and provider 248 ensuring data currency.

Portal server 220 can include registration handler 222, management handler 224, data handler 226, and data store 228. The registration handler 222 can register real-time information required by each portlet P1-P6 as well as a frequency of the real-time data retrieval interval. The registration handler 222 ensures that updates occur between portal server 220 and an associated data source 240-243 to ensure the frequency requirements of the clients 210-214 are satisfied.

Management handler 224 receives data requests from portlets P1-P6 and responds to the same. When necessary, management handler 224 can spawn new data acquisition processes, which execute in data handler 226. Additionally, management handler 224 can manage relationships between aggregated data sets and individual portlets P1-P6, which receive data updates based upon an aggregated data set.

Data handler 226 can establish data acquisition processes and/or threads to acquire data of a specified type from a data source 240-243. The data acquisition processes of data handler 226 can be synchronous and/or asynchronous with data requests from clients 210-214. When asynchronous, data store 228 can be used to cache retrieved data.

Networks 252 and 254 can include any hardware, software, and firmware necessary to convey data encoded within carrier waves. Data can be contained within analog or digital signals and conveyed though data or voice channels. Networks 252 and 254 can include local components and data pathways necessary for communications to be exchanged among computing device components and between integrated device components and peripheral devices. Networks 252 and 254 can also include network equipment, such as routers, data lines, hubs, and intermediary servers which together form a data network. Networks can also include circuit-based communication components and mobile communication components, such as telephony switches, modems, cellular communication towers, and the like. Each of the networks 252 and 254 can include line based and/or wireless communication pathways.

Data store 228 can be a physical or virtual storage space configured to store digital information. Data store 228 can be physically implemented within any type of hardware including, but not limited to, a magnetic disk, an optical disk, a semiconductor memory, a digitally encoded plastic memory, a holographic memory, or any other recording medium. Data store 228 can be a stand-alone storage unit as well as a storage unit formed from one or more physical devices. Additionally, information can be stored within data store 228 in a variety of manners. For example, information can be stored within a database structure or can be stored within one or more files of a file storage system, where each file may or may not be indexed for information searching purposes. Further, data store 228 can utilize one or more encryption mechanisms to protect stored information from unauthorized access.

Figure 3:
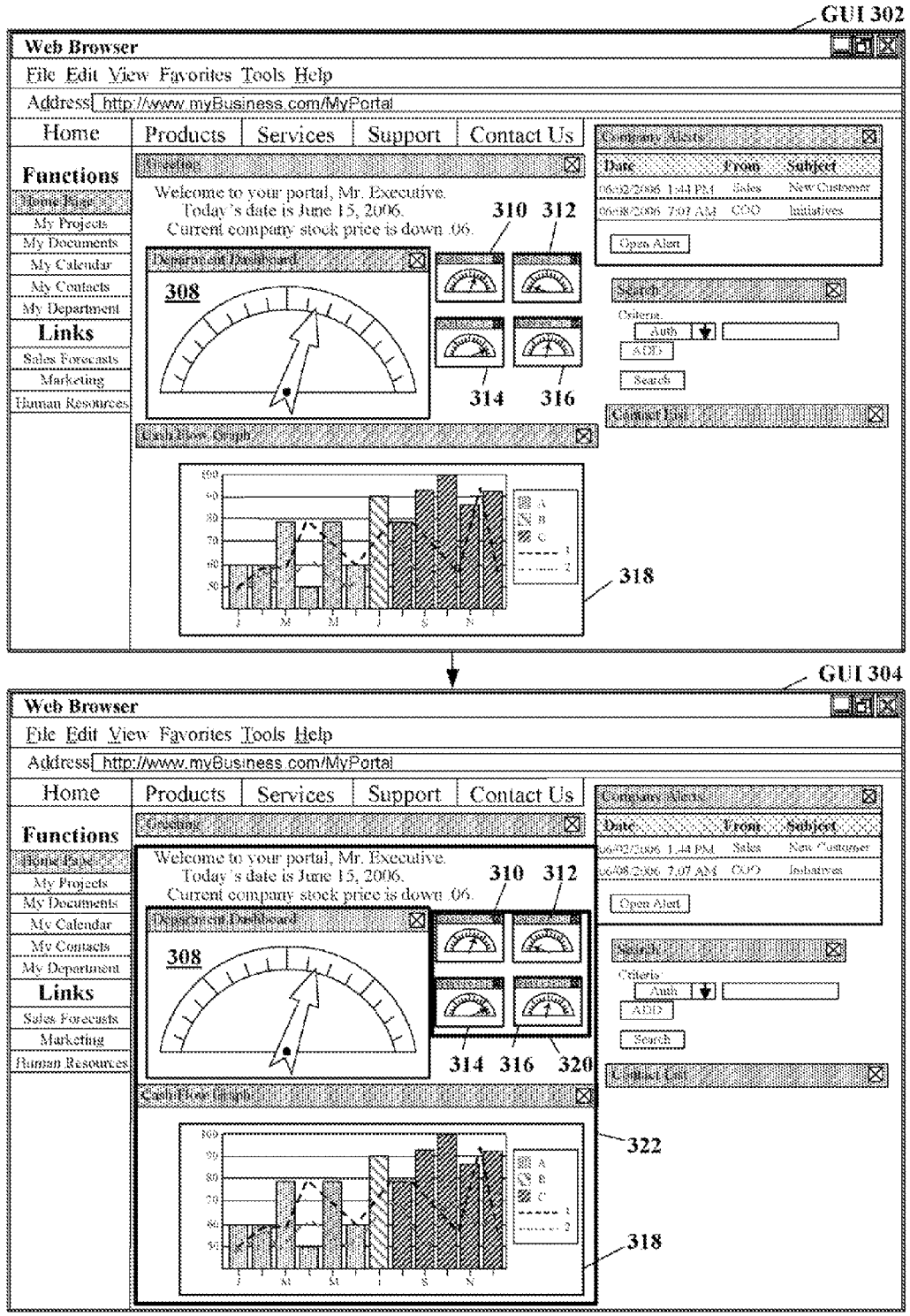
FIG. 3 shows graphical user interfaces (GUIs) containing multiple portlets, where information required by the portlets is aggregated by a portal gateway in accordance with an embodiment of the inventive arrangements disclosed herein.

FIG. 3 shows graphical user interfaces (GUIs) 302 and 304 containing multiple portlets, where information required by the multiple portlets is aggregated by a portal gateway in accordance with an embodiment of the inventive arrangements disclosed herein. GUI 302 shows the portal before data aggregation occurs and GUI 304 shows the same portal after aggregation.

The portal can include portlets 308, 310, 312, 314, 316, and 318, each presenting current company performance statistics. The performance statistics are presented using different GUI controls, which include gauges, charts, summaries, tickers, and the like. The GUI controls can be designed to aid a user to quickly digest the company information. The performance statistics and presentation controls can be customized by a user to suit that user's needs. Information displayed in portlets 308-318 can be updated in real-time. The GUI controls can be automatically updated as performance information upon which the controls are based changes.

As shown, portlets 308-316 can present company performance information as a series of gauges. Portlet 318 can show a performance chart. Conventionally, each of the gauges shown in portlets 308-316 as well as the chart shown in portlet 318 will be directly and independently linked to a data source. Multiple real-time information streams will be required to keep the portlet 308-318 information updated. Relying on multiple real-time streams for each portlet can consume substantial computing resources and is somewhat inefficient. Further, using multiple real-time streams for each portlet 308-318 creates scalability problems and data latencies can be expected. Any latencies between the data source and a user of GUI 302 can result in the GUI controls flickering, a portal appearing to "lock-up", and other user noticeable affects that decrease the overall user experience. Use of a portal server, as shown in system 200, can decrease the scalability problems and can reduce latencies as direct data updates for portlets 308-318 can be provided by a portal server.

The portal server further reduces unnecessary traffic and increases infrastructure scalability by aggregating data required by multiple portlets into a common data set, as shown in GUI 304. In GUI 304, one aggregated data set 320 can be created for portlets 310-316. A different data set 322 can aggregate data associated with data set 320 and with portlets 308 and 318. Once a data set 320 or 322 is created, the portal server can create a link with a data source that updates the data set 320 or 322. This link can satisfy the data update requirements of multiple component portlets and/or data sets to minimize traffic between the portal server and the data source.

It is assumed that the GUI controls for portlets 308-318 and the information contained therein is based upon a definable data superset (data set 322) and that information for portlets 310-316 are based upon a definable data superset (data set 320). The values of the GUI controls can be based on a combination of relatively fixed data (baseline data) and data included in an updated data set 320 and/or 322. The baseline data can be locally stored upon a client machine and/or a portal server to minimize unnecessary requests to a data source. Similarly, processing operations required to convert raw company data (of the baseline data and/or data set 320-322) to values needed by the GUI controls can be performed by a client machine and/or portal server.

Notably, the portal server can ascertain the data requirements for each of the portlets and can ensure portlet-to-gateway updates are performed with a proper frequency using a gateway registration handler, as previously described. A management handler of the portal server can coordinate between an aggregated data set 320-322 and each of the portlets 308-318 and/or processes handled by a registration handler for various ones of the portlets 308-318. A data handler of the portal server can ensure data updates between data sources and the gateway are iteratively preformed with a suitable frequency to maintain data currency.

Figure 4:
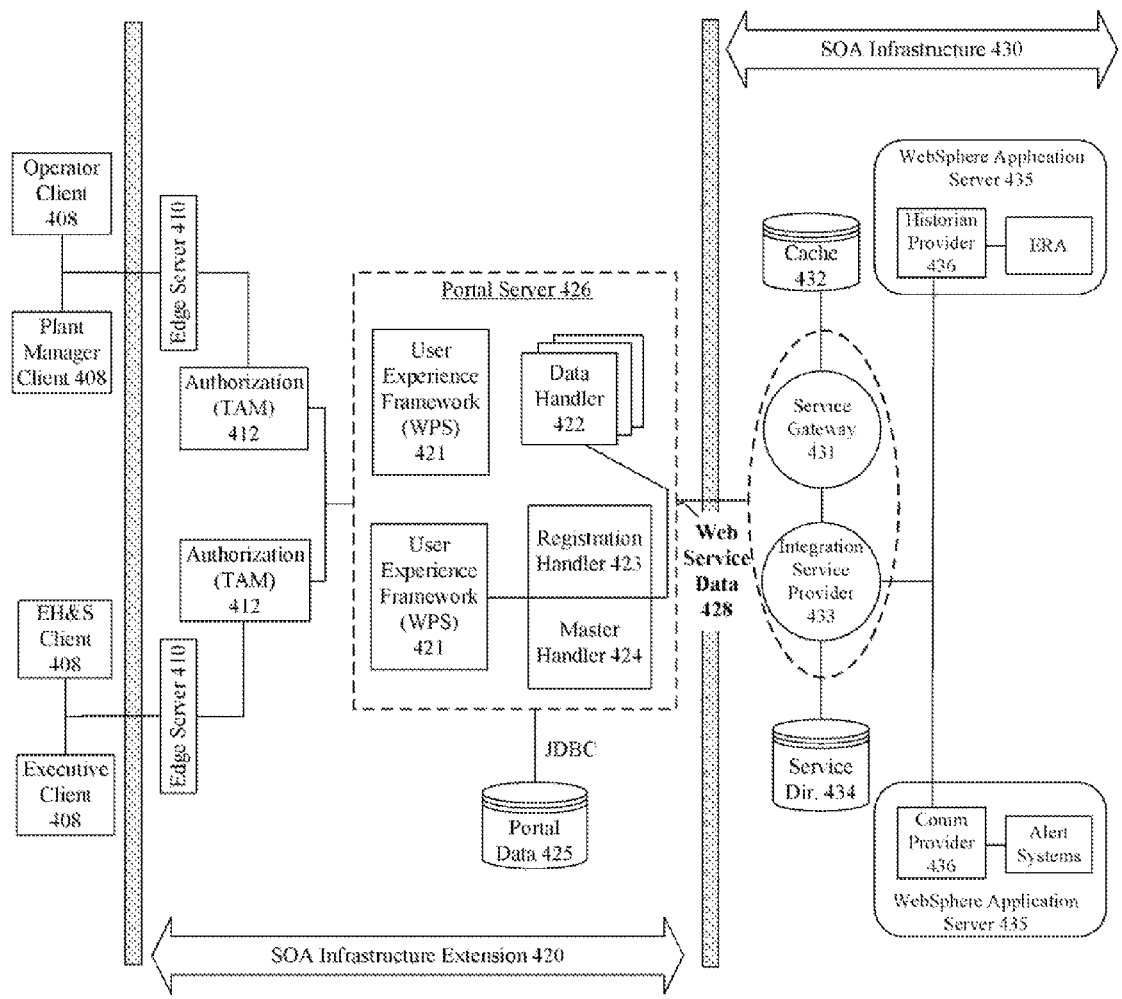
FIG. 4 is a schematic diagram of a system showing a Service Oriented Architecture (SOA) infrastructure that is extended to include a portal server in accordance with an embodiment of the inventive arrangements disclosed herein.

FIG. 4 is a schematic diagram of a system 400 showing a SOA infrastructure 430 that is extended 420 to include a portal server 426 in accordance with an embodiment of the inventive arrangements disclosed herein. In system 400, one or more clients 408 can include portlets in which enterprise data is presented. The enterprise data can be obtained from enterprise data sources. The enterprise data sources can include data provided by providers 436, which utilize application servers to serve application data for the enterprise. The application data can be provided to portal gateway 426 as one or more Web services 428. Service gateway 431 can be a communication intermediary between the portal server 426 and the SOA infrastructure 430. Portal server 426 can be optionally implemented as a cluster of portal servers (not shown) to provide redundancy and to enable resilient operation of system 400 should one or more portal servers 426 fail.

Enterprise information obtained via Web services 428 can be stored by portal server 426 in portal data store 425. The information in portal data store 425 can be continuously updated in accordance with established Web services 428 to ensure that portal data store 428 always includes current information. The continuous updates can occur frequently enough to provide accurate real-time data to clients 408 directly from the data store 425.

Clients 408 can communicate with portal server 426 via one or more edge servers 410. Authorization engines 412 can ensure security of portlet data. The portal server 426 can optionally include user experience engines 421 that interface with specific clients 408. The user experience engines 421 can be communicatively linked to registration handler 423, master handler 424, and data handler 422, as shown. Handlers 422-424 can together ensure that data presented within client 408 portlets and obtained from providers 436 is continuously updated.

In one embodiment, user experience engines 421 can customize enterprise content for a particular communication channel, such as a customer channel, an employee channel, a management channel, and IT administrator channel, and the like. The communication channels can also be linked to different market channels, such as storefront systems, kiosks, e-retailing Web sites, and the like. Accordingly, the user experience engines 421 can customize streams of enterprise data obtained from an enterprise infrastructure for different front-end systems. Segmenting enterprise data from different front end systems used by clients 408 in such a loosely coupled fashion ensures that enterprise data can be utilized by different separately customizable systems without negatively affecting back-end systems.

It should be noted that the base SOA infrastructure 430 of system 400 is a specific architecture for providing enterprise services and data that combines simple, loosely-coupled advantages of SOA based systems with more traditional methods of integration techniques, details of which are the subject matter of other inventive solutions. Infrastructure 430 can be extended 420 to include the portal server 426 concept.

System 400 represents one of many contemplated embodiments of the present portlet enhancement solution and one contemplated application for portal server 426. The invention is not to be construed as limited to arrangements shown in system 400, and the portal server 426 can be used in any of a variety of situations and systems, as described in system 200 and throughout this document.

To elaborate upon system 400, the service gateway 431 of SOA infrastructure 430 can provide enterprise service access to channel applications executing on clients 408. The service gateway 431 can be responsible for accepting SOAP formatted XML requests from local application servers 435. It then can discover the appropriate service provider 436 for each request and can pass the request to the appropriate provider 436, adding any additional meta-data into the XML request as needed.

These transformations are usually common activities that all service requests must have performed before they are received by service provider 436. The service gateway 431 can serve as a central component that performs these functions reducing the burdens of the channel client 408 or application. The gateway 431 may bind to the provider dynamically or through well-defined communication channels. The service gateway 431 can also store bound provider data within a dynamic runtime cache 432. The gateway 431 can directly respond to portal server 426 requests using data stored in the dynamic runtime cache 432. Providers 436 can receive data updates from an information source, which it can propagate to bound data elements, such as those within the dynamic runtime cache 432. A subscription methodology can be used to keep the information in the dynamic runtime cache 432 current.

In the event of an unknown service request, the service gateway 431 can request a binding location from an integration service provider 433. The integration service provider 433 can be a system of record for all valid service requests. Once found, the request will be passed to the appropriate endpoint. The service gateway 431 can store the location of the provider 436 and bind directly on subsequent requests.

The service directory 434 can be an online directory that provides a uniform way for businesses and organizations to describe available services, service capability, required interface parameters, and output parameters resulting from the described services. The services of the directory 434 can include all services accessible via service gateway 431. In one embodiment, the service directory 434 can use an eXtensible Markup Language (XML) based directory of Web services. Web services specified in the service directory 434 can be described using a Web services description language (WSDL). The service directory 434 can be a universal description discovery and integration (UDDI) directory.

Inter workings of system 400 can be shown using illustrative examples. In one example, a portlet client can utilize a JAVASCRIPT to request a refresh of portlet data. The request can pass through edge server 410 to authorization server 412, which ensures that the requesting client is authorized to access portal server 426. The request can be received by registration handler 423, which enables registration of real-time information types. The registration handler 423 can trigger master handler 424 to create threads to obtain updated data from a data source. Each thread of the master handler 424 can have a corresponding data updating thread created within the data handler 422. Each data handler 422 thread can continuously and asynchronously retrieve data through the SOA infrastructure 430. Data retrieved from the data handler 422 can be placed in portal data store 425. The master handler 424 can map locations of data in the portal data store 425 to portlet update requests. The master handler 424 can provide the update information for the requesting portlets as needed. For example, when the same client 408 requests another portlet update, the master handler 424 can directly retrieve update information from the portal data store 425 and can directly provide this information to the requesting client 408.

In another example demonstrating portal server resiliency, a portlet of client 408 can utilize a JAVASCRIPT to request a refresh of data to update in the portlet. The client 408 can already have authorized itself, so that the refresh request can pass through the edge server 410 and authorization server 412 to an assigned portal server 425. This previously used portal server 425 can be unavailable, which can cause the refresh request to be automatically conveyed to a backup node. A process to handle the page/portal that includes the portlet from which the request was received can be initialized on the backup node. Handler threads for handlers 422-424 can execute. The backup node can obtain data directly from portal data store 425 if available. The data handler 422 and associated threads can continuously and asynchronously retrieve real time data through the SOA infrastructure 430 for the portlets being handled by the backup node. The refresh request can be responded to by the backup node using either previously cached information, when available, or the real-time data obtained through the SOA infrastructure 430. Should the original portal server 426 become available, responsibilities for handling portlet requests from clients 408 can be seamlessly transferred from the backup node to the original portal server 426.

Figure 5:
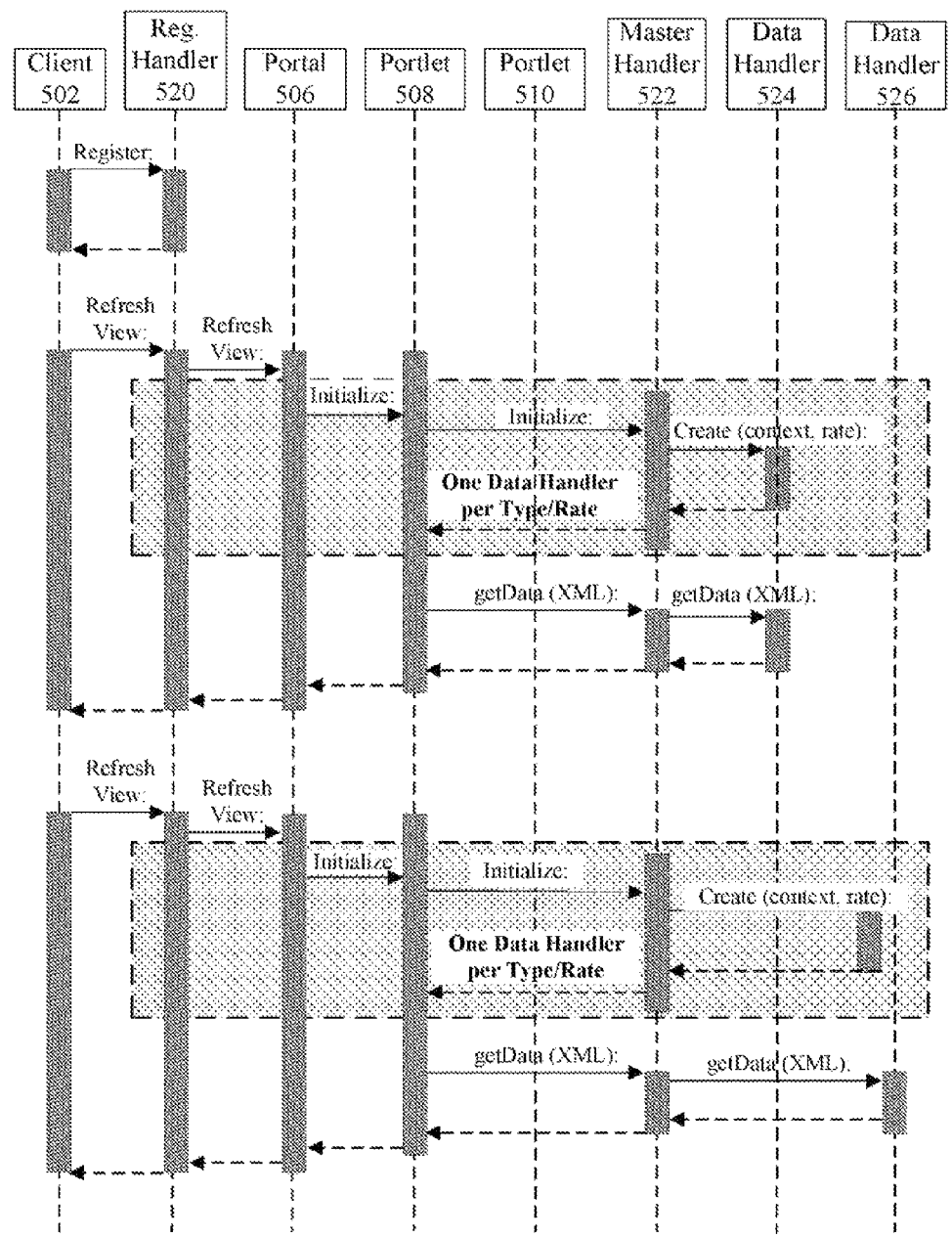
FIG. 5 is a flow diagram depicting components and interactions required for initializing a portal page in accordance with an embodiment of the inventive arrangements disclosed herein.

FIG. 5 is a flow diagram 500 depicting components and interactions required for initializing a portal page in accordance with an embodiment of the inventive arrangements disclosed herein. Specifically, diagram 500 shows interactions between a client 502 with a portal 506 that includes portlets 508 and 510. Each of the portlets 508-510 can be updated using a portal server that includes registration handler 520, master handler 522, and data handlers 524 and 526.

In diagram 500, client 502 can register itself with registration handler 520. Registration can initialize each portlet 508-510 and the type of data required by each portlet 508-510. Once registered, the registration handler 520 can manage a portlet context for future requests. On a first refresh request issued by client 502 of a particular type, the portal server can initialize the master handler 522. The master handler 522 can spawn appropriate processes and/or threads, such as data acquisition threads spawned in data handler 524. Each data type/data context/refresh rate combination can have an associated data handler thread and/or process. Portlet 508 can then retrieve data from the master handler 522, which in turn gets the latest data from the data handler 524 servicing portlet 508.

On another refresh issued by client 502 for a different type of update, the portal server can again initialize the master handler 522. The master handler 522 can again spawn appropriate data acquisition threads/processes for the different update type. The new type can be handled, for example, by a process of data handler 526. The portlet 508 can then retrieve data from the master handler 522, which in turn can acquire the latest data from the data handler 526 serving this type of data.

Figure 6:
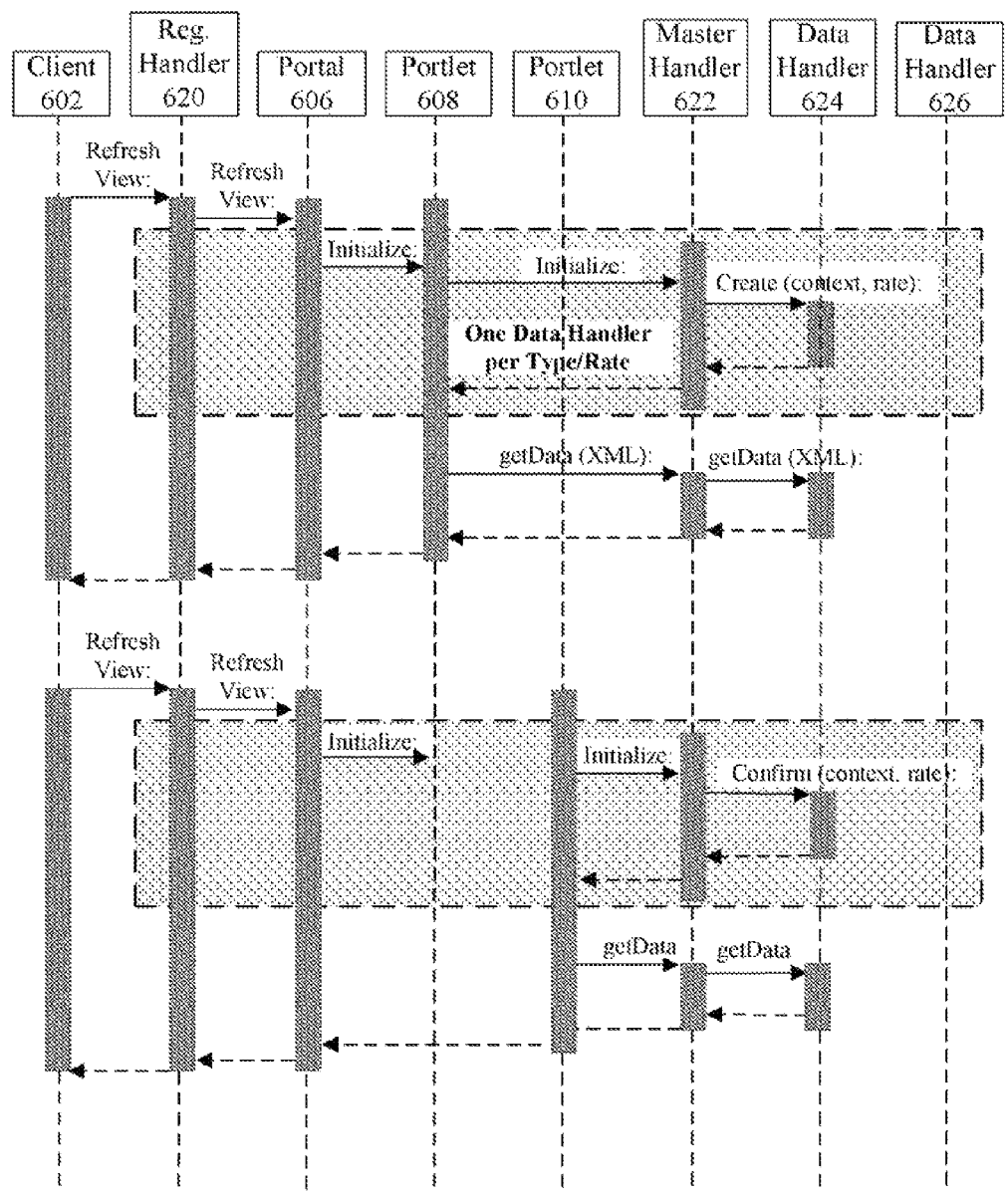
FIG. 6 is a flow diagram depicting components and interactions required for initializing a portal page in accordance with an embodiment of the inventive arrangements disclosed herein.

FIG. 6 is a flow diagram 600 depicting components and interactions required for initializing a portal page in accordance with an embodiment of the inventive arrangements disclosed herein. Specifically, diagram 600 depicts interactions required when a portlet makes a refresh request for the same type of information with different refresh rates.

In diagram 600, client 602 can register with registration handler 620, which permits handler 620 to manage portlet contexts for future requests. A first data refresh request of a particular type can be issued by the client 602. In response, the portal server can initialize a master handler 622. The master handler 622 can cause data handler 624 to initiate a process that ensures data is acquired form a source at a determined frequency. The portlet 608 can then iteratively retrieve data from master handler 622, which receives the required data in turn from data handler 624.

Portlet 610 can also issue a refresh request for the same type, which is sent to master handler 622. The master handler 622 can identify that an existing process is in place to acquire needed information for portlet 610. In one embodiment, the process used to acquire data for portlet 608 can be a process that retrieves an aggregated data set, which can be used to satisfy data requirements of multiple portlets. For instance, the previously created process managed by data handler 624 can acquire data for data set 320 shown in FIG. 3, where portlets 608-610 represent instances of portlets 310-316. Once the existing process is identified, the master handler 622 can confirm that the data refresh rate of the existing process is sufficient for portlet 610. Otherwise, the frequency of the existing data acquisition process can be appropriately adjusted. Portlet 610 can retrieve data updates from master handler 622, which in turn receives them from data handler 624.

Figure 7:
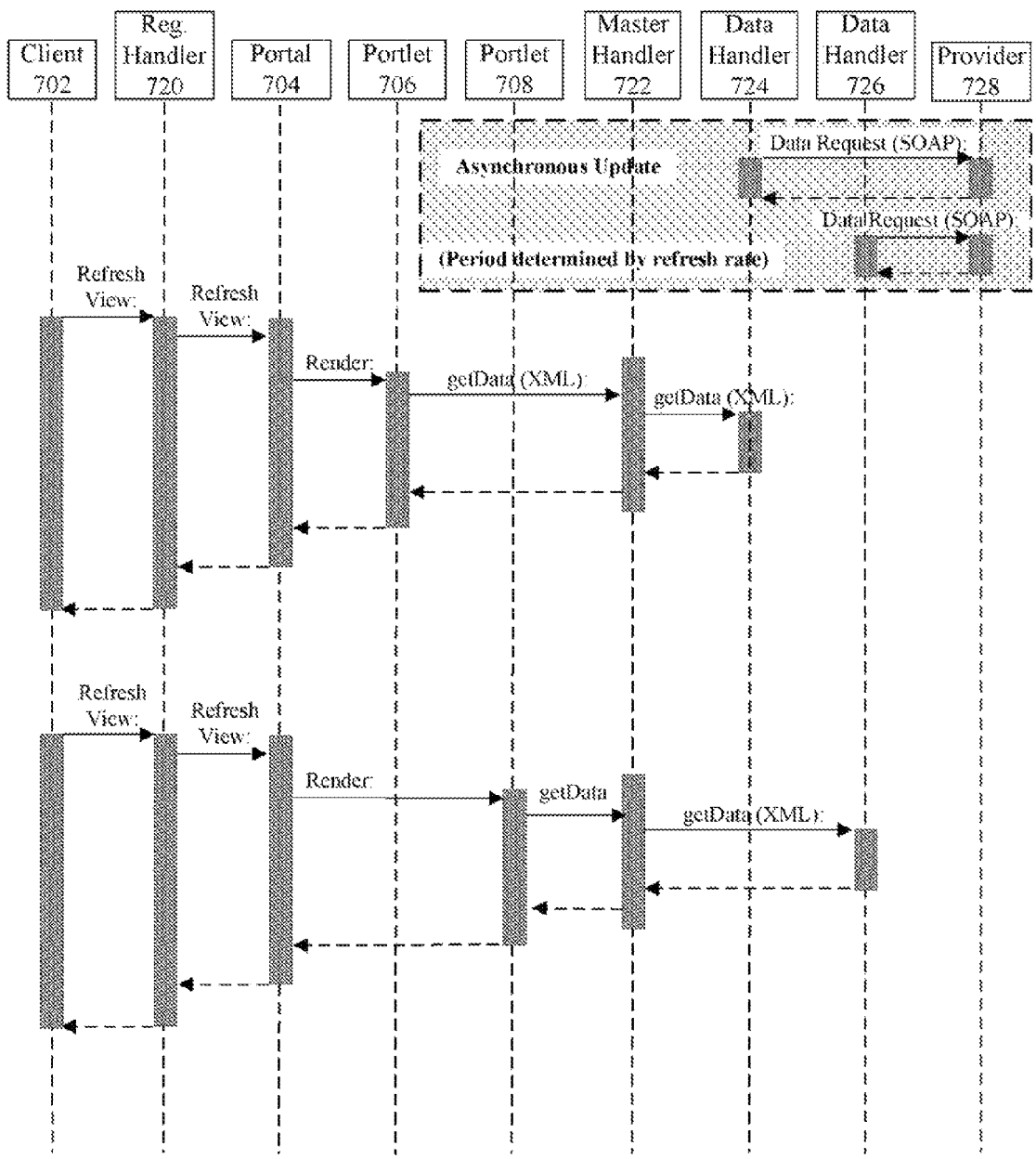
FIG. 7 is a flow diagram depicting components and interactions required for initializing a portal page in accordance with an embodiment of the inventive arrangements disclosed herein.

FIG. 7 is a flow diagram 700 depicting components and interactions required for initializing a portal page in accordance with an embodiment of the inventive arrangements disclosed herein. Diagram 700 shows that the data acquired by data handlers 724 and 726 from a data source can occur asynchronously with data update requests from client 702. For example, the data handlers 724 and 726 can continuously update a local data store, such as data store 228 of FIG. 2. Content from the local data store can be used to respond to portlet requests.

In diagram 700, data handler 724 and 726 can issue data requests (such as SOAP requests) to a data source, such as provider 728. In one embodiment, a polling methodology can be used by the data handlers 724-726 to obtain information, where a polling period can be determined by client 702 requirements. The polling period must be equal or less than the shortest data refresh period required by a client 702.

In another embodiment, a subscription methodology can be used by the data handlers 724-726. That is, data subscriptions can be established between the data handlers 724-726 and the data providers 728. Whenever the data provider 728 detects an update of content for which a subscription exists, the update can be pushed to an appropriate data handler 724-726. The updates can then be locally cached.

Whenever a portal 704 update process requires that portlet 706 data be refreshed, master handler 722 can be queried. Master handler 722 can request response data from data handler 724, which uses locally cached information to respond. Similarly, a different portlet 706 can submit a request to master handler 722 for a different data context, this one handled by handler 726. Master handler 722 can request response data from handler 726, which can use previously cached data to respond, as shown.

Figure 8:
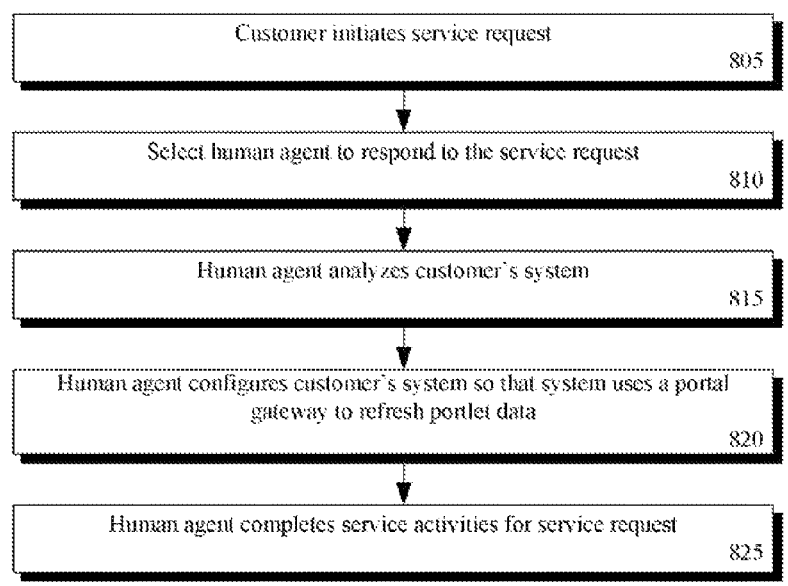
FIG. 8 is a flow chart of a method, where a service agent can configure a system that utilizes a portal server to refresh portlets in accordance with an embodiment of the inventive arrangements disclosed herein.

FIG. 8 is a flow chart of a method 800, where a service agent can configure a system that utilizes a portal server to refresh portlets in accordance with an embodiment of the inventive arrangements disclosed herein. Method 800 can be preformed in the context of system 200.

Method 800 can begin in step 805, when a customer initiates a service request. The service request can be a request for a service agent to configure or troubleshoot a software system that refreshes portlets via a portal server as detailed herein. In step 810, a human agent can be selected to respond to the service request. In step 815, the human agent can analyze a customer's current system and can develop a solution. In step 820, the human agent can configure the customer's system so that the system can utilize a portal server to refresh information of portlets. The portal server can service multiple clients and can be arranged in a cluster to ensure resiliency. The portal server can obtain information for refreshing the portlets from any data source, including data providers of a SOA. In step 825, the human agent can complete the service activities.

It should be noted that while the human agent may physically travel to a location local to adjust, the customer's computer or portal server, physical travel may be unnecessary. For example, the human agent can use a remote agent to remotely manipulate the customer's computer system or portal server as necessary.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for providing data to portlets comprising:
   registering, with a portal server, a plurality of portlets executing on a client to determine by the portal server a type of data required by each of the plurality of portlets, wherein the registering establishes a portlet context for handling future data requests received from the portlets at the portal server for each of the plurality of portlets, and wherein the plurality of portlets are organized into a common data set;
   determining, at the portal server, responsive to registering the plurality of portlets as a common data set, a type of information associated with one each one of the plurality of portlets in the common data set;
   initializing, at the portal server, responsive to determining the type of information, a data acquisition process to obtain the determined type of information from a data source for each one of the plurality of portlets in the common data set;
   acquiring data corresponding to the type of information from the data source at the portal server using the initialized data acquisition process;
   the portal server placing the acquired data in a data store associated with the portal server;
   receiving a data request at the portal server for data of the determined type from at least one of the plurality of portlets;
   aggregating data for the plurality of portlets in the common data set into an aggregated data set at the portal server in response to the data request; and
   responding to the data request by transmitting the aggregated data set to the client, wherein the client uses the aggregated data set to satisfy the data request and to provide data to at least one other portlet in the common data set.

2. The method of claim 1, wherein the plurality of portlets are a subset of all portlets of the client.

3. The method of claim 1, wherein the portal server service is one of a plurality of portal servers configured in a cluster of portal servers.

4. The method of claim 3, wherein the plurality of portal servers include a backup node and a primary node, where the backup node automatically performs the steps of claim 1 normally handled by the primary node should the primary node fail.

5. The method of claim 3, wherein the plurality of portal servers utilize load balancing to distribute load received from a plurality of clients.

6. The method of claim 1, wherein the portal server includes a registration handler, a master handler, and a data handler, wherein the registration handler performs the registering step, wherein the master handler performs the receiving and responding steps, and wherein the data handler performs the acquiring step.

7. The method of claim 6, wherein the data source is a service provider of a Service Oriented Architecture (SOA), and wherein the data acquisition process is a Web service.

8. The method of claim 1, wherein the data source is a service provider of a Service Oriented Architecture (SOA), and wherein the data acquisition process is a Web service.

9. The method of claim 1, wherein the acquiring step places the acquired data in a local cache before the data request is received, wherein the responding step utilizes preexisting acquired data in the local cache.

10. The method of claim 1, wherein the receiving of the data requests reoccur with a known frequency specified in the registering step.

11. The method of claim 1, wherein the acquiring step automatically reoccurs with a frequency specified for the data acquisition process.

12. The method of claim 1, wherein the data source is a first data source, the method further comprising:
    determining a second type of information associated with a different one of the portlets, wherein the initializing and acquiring steps use the data acquisition process to obtain the second type of information from a second data source, whereby the data acquisition process aggregates data from the second data source into the aggregated data set.

13. The method of claim 1, wherein the steps of claim 1 are performed by at least one of a human agent and a computing device manipulated by the human agent, the steps being performed in response to a service request.

14. A method for providing data to portlets comprising:
    registering, with a portal server, a plurality of portlets executing on a client to determine by the portal server a type of data required by each of the plurality of portlets, wherein the registering establishes a portlet context for handling future data requests received from the portlets at the portal server for each of the plurality of portlets, and wherein the plurality of portlets are organized into a common data set;

receiving, at the portal server, data update requests originating from a plurality of different portlets of a client which are registered with the portal server and organized into a common data set, wherein each of the data update requests are reoccurring requests for data to keep information displayed in each of the portlets at the client current with a corresponding data source;

for each of the data update requests, establishing, at the portal server, a data acquisition process with the data source;

automatically creating a data service at the portal server configured to provide data needed to respond to the received data update requests;

the data service receiving data from the data source corresponding to the data update requests-and storing the data in a data store associated with the portal server;

aggregating the data into an aggregated data set at the portal server, the aggregated data set including data for each of the plurality of different portlets in the common data set; and responding to the data update requests by transmitting the aggregated data set from the portal server to the client having the plurality of different portlets, wherein the data service is a Web service, and wherein the data source is a service provider of a Service Oriented Architecture.

15. The method of claim 14, wherein the data service repetitively receives the data from the data source with a specified frequency that is asynchronous with the reoccurring requests.

16. The method of claim 14, wherein the data source is a first data source, wherein at least some of the data update requests correspond to a second data source, and data is further received from the second data source by the data acquisition process.

17. The method of claim 14, further comprising:
registering, with a portal server, a plurality of different portlets, that execute on a client, to determine, by the portal server, a type of data required by each of the plurality of different portlets, wherein the registering establishes a portlet context for handling data requests that are subsequently received from the portlets at the portal server for each of the plurality of different portlets, and wherein the plurality of different portlets are organized into a common data set.

18. A portal server including a non-transitory machine readable storage medium, comprising:
program code stored in the machine readable storage which when executed by the portal server provides functionality for a registration handler configured to register Web pages including a plurality of portlets, wherein the registration handler determines types of data required by each of the plurality of portlets and a frequency with which data updates of the determined types of data are needed, wherein the portlets are organized into a common data set, wherein the registration handler establishes a portlet context for handling future data requests received from the portlets at the portal server for each of the plurality of portlets, and wherein the plurality of portlets are organized into a common data set;
program code stored in the machine readable storage which when executed by the portal server provides functionality for a master handler configured to receive data update requests of the determined types from the portlets and to respond to the data update requests; and
program code stored in the machine readable storage which when executed by the portal server provides functionality for a data handler configured to repetitively obtain data of the determined types of data from data sources in accordance with data acquisition processes spawned by the master handler and executed by the data handler, wherein the data handler aggregates the data into an aggregated data set;
wherein the portal server responds to the data update requests by transmitting the aggregated data set.

19. The portal server of claim 18, further comprising:
a portal data store configured to cache data acquired from the data handler, wherein the master handler utilizes previously acquired data stored in the portal data store to directly respond to the update requests.

20. The portal server of claim 18, wherein the portal server is one of a plurality of portal servers which are clustered to provide resilient operation should one of the plurality of portal servers fail.

* * * * *